T. L. BOOKER.
Hame-Fasteners.
No. 141,690. Patented August 12, 1873.
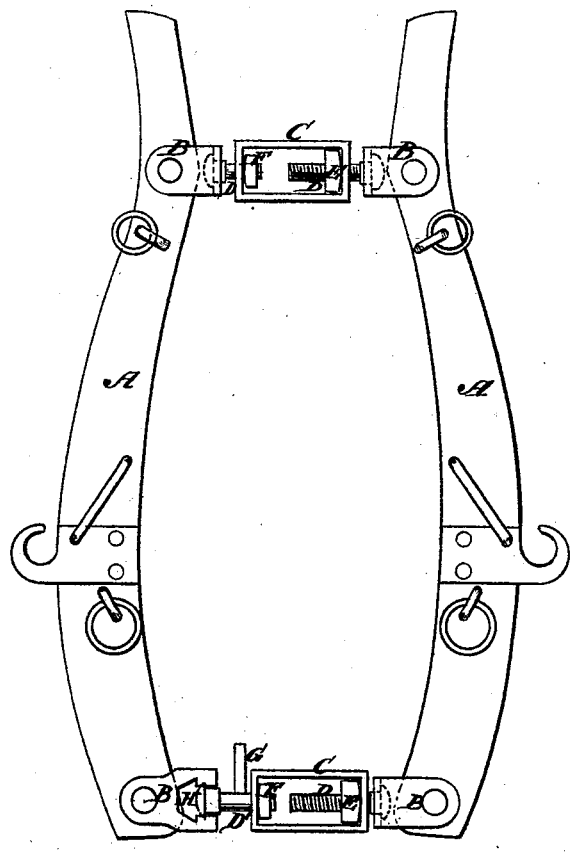
Witnesses:
E. Wolff
O. Sedgwick
Inventor:
T. L. Booker
Per Munn & Co.
Attorneys.

UNITED STATES PATENT OFFICE.

THOMAS L. BOOKER, OF SHADY GROVE, VIRGINIA, ASSIGNOR TO HIMSELF AND E. H. BOOKER, OF DONALDSONVILLE, SOUTH CAROLINA.

IMPROVEMENT IN HAME-FASTENERS.

Specification forming part of Letters Patent No. 141,690, dated August 12, 1873; application filed May 31, 1873.

*To all whom it may concern:*

Be it known that I, THOMAS L. BOOKER, of Shady Grove, in the county of Franklin and State of Virginia, have invented a new and useful Improvement in Hame - Fastener, of which the following is a specification:

The object of this invention is to provide ready and convenient means for adjusting and fastening hames on the collars of horses and mules; and it consists in a connecting-band, screw-bolts, and clips at the ends of the hame, the construction being as hereinafter described.

My invention is illustrated in the accompanying drawing.

Similar letters of reference indicate corresponding parts.

A represents the hames. B is a clip on each end of each part of the hame. C is a band, which connects the clips at each end by means of the bolts D D'. At the lower end of the hame one of the clips is cut away, or an opening is made, so that the head of the bolt will slip out, which allows the hame to be opened for putting it on or taking it off the collar. By means of the screw-nuts E on the bolts D the parts of the hame may be drawn together or spread apart, as may be necessary, to fit the collar or horse. The nuts F on the bolts D' may be riveted on, when the bolts are once passed through the ends of the band. G is a short lever in the lower bolt D', by means of which the bolt is turned so that it will slip through the opening H in the clip for opening the hame.

The clips are securely fastened to the hame by means of bolts or rivets, but so that they turn freely. The bands will also turn and adjust themselves to the proper position. The device is flexible and durable, and will allow the hames to be adjusted, fastened, and released with the greatest facility.

Having thus described my invention, I claim as new and desire to secure by Letters Patent—

A fastening for hames formed by the combination of clips B, band C, and bolts D D', substantially as shown and described.

THOMAS LOURY BOOKER.

Witnesses:
HENRY F. CROAF,
WILLIAM H. BONDURANT.